Feb. 20, 1934. L. L. CARSON Re. 19,088

PUMP VALVE

Original Filed Aug. 11, 1930

WITNESS:

Lee L. Carson, INVENTOR

BY Victor J. Evans

ATTORNEY

Reissued Feb. 20, 1934

Re. 19,088

UNITED STATES PATENT OFFICE 19,088

PUMP VALVE

Lee L. Carson, San Diego, Calif., assignor, by direct and mesne assignments, of one-half to George T. Dunn and one-half to Lillie M. Carson, both of San Diego, Calif.

Original No. 1,880,120, dated September 27, 1932, Serial No. 474,586, August 11, 1930. Application for reissue March 27, 1933. Serial No. 663,073

10 Claims. (Cl. 251—128)

Figure 1:
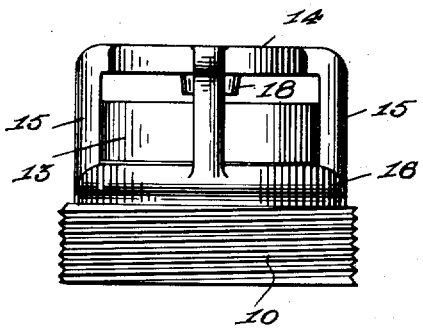

My invention relates to certain new and useful improvements in valve constructions and the objects of my invention are:

First, to provide a valve construction which is particularly arranged for use as a pump valve;

Second, to provide a pump valve which eliminates stems, springs and the like;

Third, to provide a pump valve which incorporates a novelly constructed combined open sided cage and valve guide;

Fourth, to provide a pump valve wherein the densities of the fluids which it handles may vary through a wide range;

Fifth, to provide a pump valve which incorporates stops for the valve element and cage designed for abutting engagement to restrict undue distortion and prevent injury to the valve member;

Sixth, to provide a pump valve member per se having a fluid receiving cup for co-action with the cage construction in the provision of a hydraulic cushion to check the other-wise accelerated movement of the valve;

Seventh, to provide a pump valve wherein the movement of the valve member is cushioned before engagement of the stop elements thereof thereby reducing percussive stresses and the attendant clattering and vibration to a minimum;

Eighth, to provide a pump valve wherein the fluid receiving cup of the valve member is defined by the extreme side walls of the valve member; and Ninth, to provide on the whole a novelly constructed pump valve which is simple, durable, efficient in its action, and which will not readily deteriorate or get out of order.

With the above and other objects in view, the invention further consists of the following novel features and details of construction, to be hereinafter more fully described, illustrated in the accompanying drawing and pointed out in the appended claims.

In the drawing:—

Figure 2:
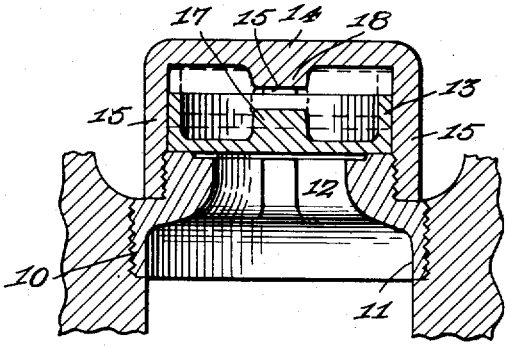
Figure 4:
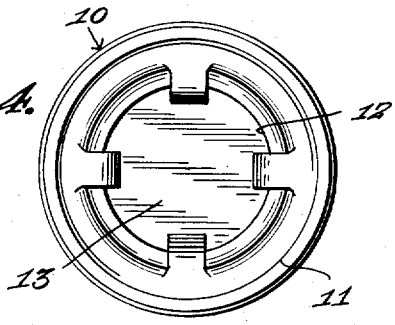
Figure 3:
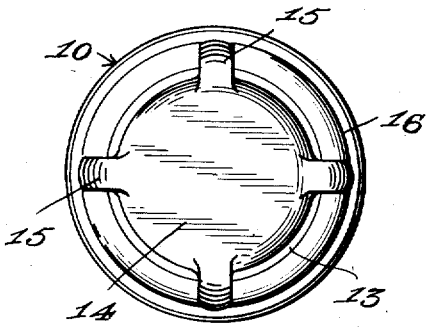
Figure 5:
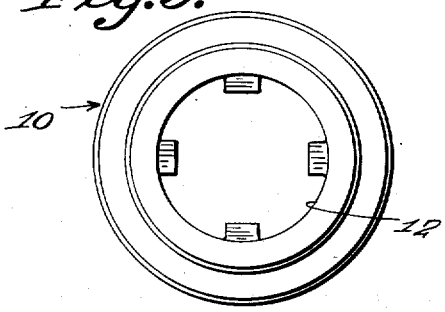

Figure 1 is a side elevation of my form of valve construction; Fig. 2 is a sectional view taken through the invention as applied; Fig. 3 is a top plan view of the invention; Fig. 4 is a bottom plan view of the invention; Fig. 5 is a top plan view of the invention with the cage and valve member removed.

Referring to the drawing in detail wherein like characters of reference denote corresponding parts, the reference character 10 indicates generally a hollow exteriorly threaded fitting having large and small communicating bores 11 and 12 respectively. The smaller end of the fitting has defined upon the peripheral edge thereof a seat for the accommodation of a valve member 13 of cup shape formation having a flat bottom wall reposing upon the aforementioned seat.

The cage construction for the valve assemblage comprises a disk member 14 having arms 15 outwardly and downwardly projecting at intervals from the periphery thereof over and about the valve member 13. An annulus 16 carried upon the extended ends of the arms 15 is interiorly threaded for the accommodation of the reduced end of the fitting.

As suggested from the illustration of my invention in Fig. 2 of the drawing, both the valve member 13 and the disk or top 14 for the cage construction are provided with stops 17 and 18 respectively aligned perpendicularly of the valve construction for abutting engagement whereby upward shifting motion of the valve member 13 to a height in excess of that of the dotted line position illustrated will be restricted whereby burrs, nicks and other defacements will not be formed upon the valve member to unbalance or otherwise influence the valve member to occupy positions other than those intended or desired.

The particular formation of the valve member is not only resorted to for the minimizing of the weight thereof so as to render same more sensitive to pressure impulses through a pump construction but also to accommodate some of the fluid allowed to pass beneath the bottom wall thereof for coaction against the inner surface of the disk 14 in the provision of a form of hydraulic brake to snub the opening action of the valve member to obviate the natural tendency of the stops 17 and 18 being subjected to sudden contact to eliminate otherwise objectionable noises.

The stop member 18 also acts to displace fluid within the cupped portion of the valve member before engagement with the other stop member thereby aiding the snubbing or cushioning action obtained by the flow of fluid from between the disk or connecting portion 14 and the valve member.

The diameter of the disk 14 is less than the external diameter of the valve member 13 as indicated in Fig. 3 of the drawing, so that the disk does not extend completely over the valve. Therefore, the top surface of the valve may be subjected to back pressure which will cause the valve to seat promptly when in operation.

Having described the invention, what is claimed is:

1. A valve comprising an annular fitting having an opening through the center thereof and provided at its top side with a seat, a cage having an annulus engaging the fitting and surrounding said seat and arms rising from said annulus, the cage having a disk at the upper ends of the arms and said disk having a stop portion at its center and under side, a cup valve member fitting snugly between the arms and having a flat under surface adapted to engage said seat and provided at its center with the stop portion adapted to engage the stop portion of the disk, the diameter of the disk being less than the external diameter of the cup valve member and greater than the internal diameter thereof whereby part of the upper surface of the valve member remains uncovered by the peripheral portion of the disk when the stop portions are in contact with each other.

2. A valve comprising an annular fitting having an opening through the center thereof and provided at its top side with a seat, a cage having an annulus engaging the fitting and surrounding said seat and arms rising from said annulus, the cage having a disk at the upper ends of the arms and said disk having a stop portion at its center and under side, a cup valve member fitting snugly between the arms and having a flat under surface adapted to engage said seat and provided at its center with the stop portion adapted to engage the stop portion of the disk, the area of said disc being less than the area of said valve member.

3. A valve comprising an annular fitting having an opening through the center thereof and provided at its top side with a seat, a cage having an annulus engaging the fitting and surrounding said seat and arms rising from said annulus, the cage having a disk at the upper ends of the arms and said disk having a stop portion at its center and under side, a cup valve member fitting snugly between the arms and having a flat under surface adapted to engage said seat and provided at its center with a stop portion adapted to engage the stop portion of the disk, the diameter of the disk being less than the external diameter of the cup valve member whereby part of the upper surface of the valve member remains uncovered by the peripheral portion of the disk when the stop portions are in contact with each other.

4. In a pump valve, an annular flat valve seat, a valve member comprising a cylindrical portion defining its outer periphery and a closed end portion at one extremity of said cylindrical portion, its outer side forming a flat valve face adapted to coact with said valve seat, its inner side forming with the cylindrical portion a fluid receiving cup, a cage for said valve member comprising, arms extending axially from said valve seat outwardly along the cylindrical portion and forming guides therefor, and a connecting portion joining the axial extremities of said arms, said connecting portion being less in area than the extreme area of said valve member, the side of said connecting portion facing said valve forming with said cup a fluid responsive means for cushioning the movement of said valve member.

5. In a pump valve, a valve seat, a cage mounted thereover comprising legs extending axially outwardly from the margins of said valve seat and terminating in radially inturned portions, and a disk supported from the inturned portions of said legs in spaced relation to said valve seat, a valve member mounted between said disk and valve seat comprising an extreme peripheral portion guided by said legs, said valve member forming a fluid receiving recess in its outer side defined by said extreme peripheral portion and arranged to coact with said disk to cushion the action of said valve member, and centered stop means disposed between said disk and said valve for stopping said valve member in spaced relation to said disk.

6. In a pump valve, a valve seat, a valve member therefor, a cage including arms extending axially outwardly from said valve seat terminating in radially inturned extremities and a disk supported in spaced parallel relation to said seat by the inturned extremities of said arms, said disk and arms defining continuous axially directed apertures extending into overlapping relation with the periphery of the valve member, said valve member having an axially directed wall at its extreme periphery adapted to coact with said legs to guide said valve member, said peripheral wall defining a fluid receiving recess in the axially outer side of said valve member adapted to coact with said disk to cushion the movement of said valve member, and centered stop means disposed between said disk and said valve for stopping said valve member in spaced relation to said disk.

7. In a pump valve, an annular flat valve seat, a valve member comprising a cylindrical portion defining its outer periphery and a closed end portion at one extremity of said cylindrical portion, its outer side forming a flat valve face adapted to coact with said valve seat, its inner side forming with the cylindrical portion a fluid receiving cup, a cage for said valve member comprising, arms extending axially from said valve seat outwardly along the cylindrical portion and forming guides therefor, and a connecting portion joining the axial extremities of said arms, said connecting portion being less in area than the extreme area of said valve member, the side of said connecting portion facing said valve forming with said cup a fluid responsive means for cushioning the movement of said valve member, and centered stop means disposed between said connecting portion of said cage and the closed end portion of said valve member for stopping said cylindrical portion in spaced relation to said connecting portion.

8. In a pump valve, a valve seat, a cage mounted thereover comprising legs extending axially outwardly from the margins of said valve seat and terminating in radially inturned portions, and a disk supported from the inturned portions of said legs in spaced relation to said valve seat, and a valve member mounted between said disk and valve seat comprising an extreme peripheral portion guided by said legs, said valve member forming a fluid receiving recess in its outer side defined by said extreme peripheral portion and arranged to coact with said disk to cushion the action of said valve member, and a centered stop and fluid displacing means disposed between said disk and said valve.

9. In a pump valve, an annular flat valve seat, a valve member comprising a cylindrical portion defining its outer periphery and a closed end portion at one extremity of said cylindrical portion, its outer side forming a flat valve face adapted to coact with said valve seat, its inner side forming with the cylindrical portion a fluid receiving cup, a cage for said valve member comprising, arms extending axially from said valve seat outwardly along the cylindrical portion and forming guides therefor, and a connecting portion joining the axial extremities of said arms, said connecting portion being less in area than the extreme area of said valve member, the side of said connecting portion facing said valve forming with said cup a fluid responsive means for cushioning the movement of said valve member, and a stop and fluid displacing means disposed between said connecting portion of said cage and said closed end portion of said valve member.

10. In a pump valve, the combination of a seat member having two exteriorly threaded portions of different diameter but concentric with each other, the outer end of the smaller portion forming a valve seat, a valve mounted thereon and having its upper surface cupped to provide a concentric fluid receptacle, and a valve retaining spider-like cage in screwthreaded engagement with the smaller exteriorly screwthreaded portion of said member having a centrally closed top wall disposed in spaced parallel relation with said valve seat and having a downwardly depending displacement member on the lower face of said centrally closed top wall adapted for cooperation with the cupped recess in said valve to form a fluid check for said valve during its upward movement, and a stop member positioned in said cupped portion of said valve adapted to engage said displacement member for forming a positive stop at the upper end of the stroke of the valve.

LEE L. CARSON.